April 10, 1962  R. A. MAHLMEISTER ET AL  3,028,675
GAGING DEVICE
Filed April 3, 1958  2 Sheets-Sheet 1
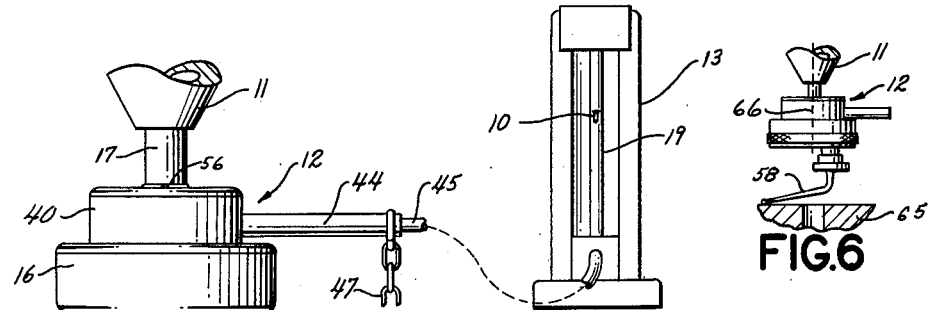
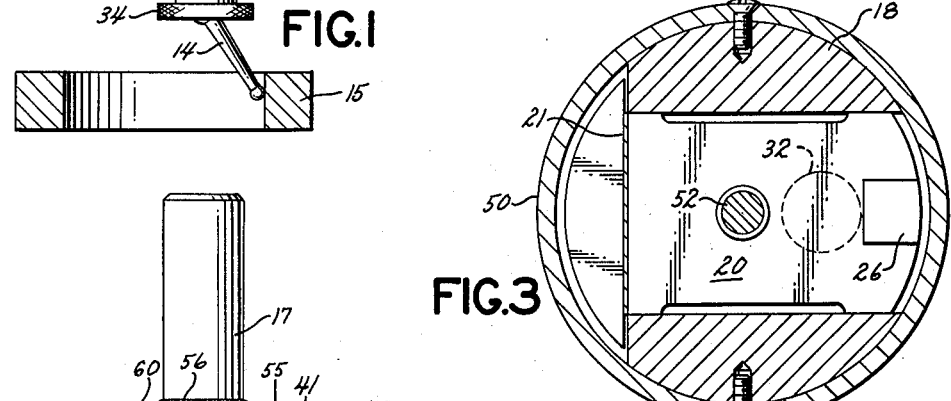
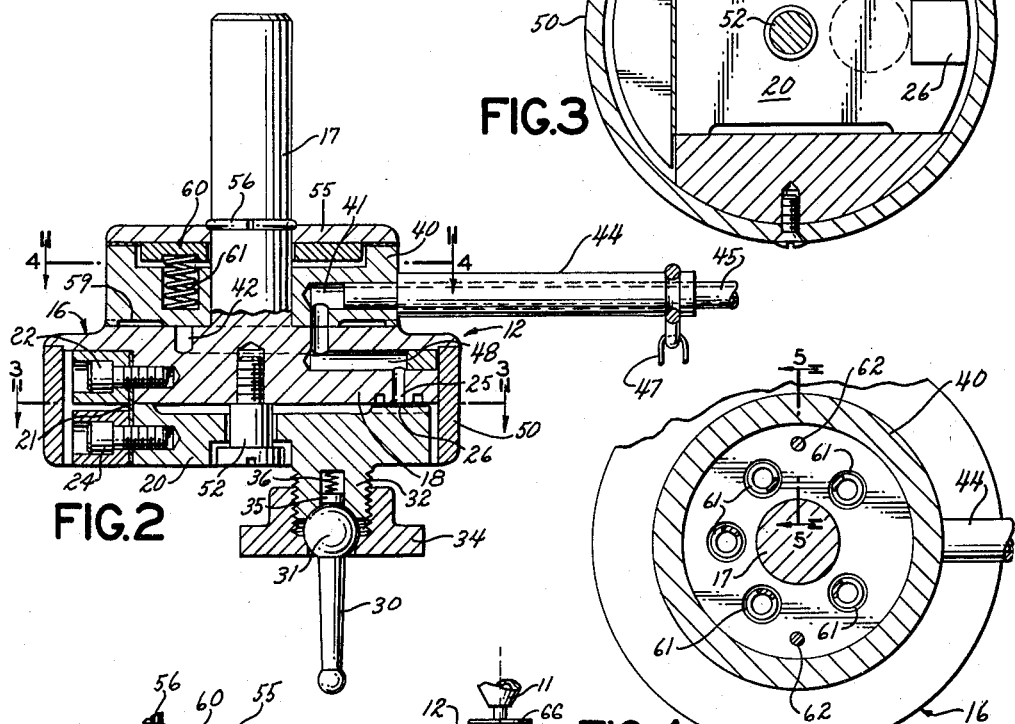
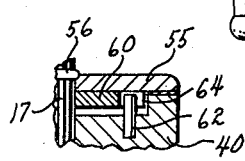
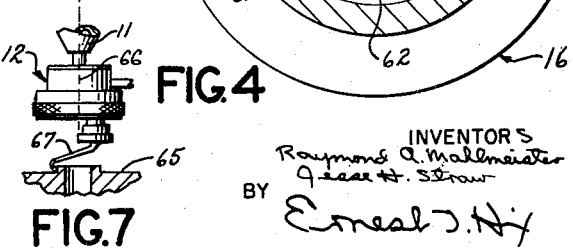
INVENTORS
Raymond A. Mahlmeister
Jesse H. Straw
BY
Ernest J. Hi
ATTORNEY

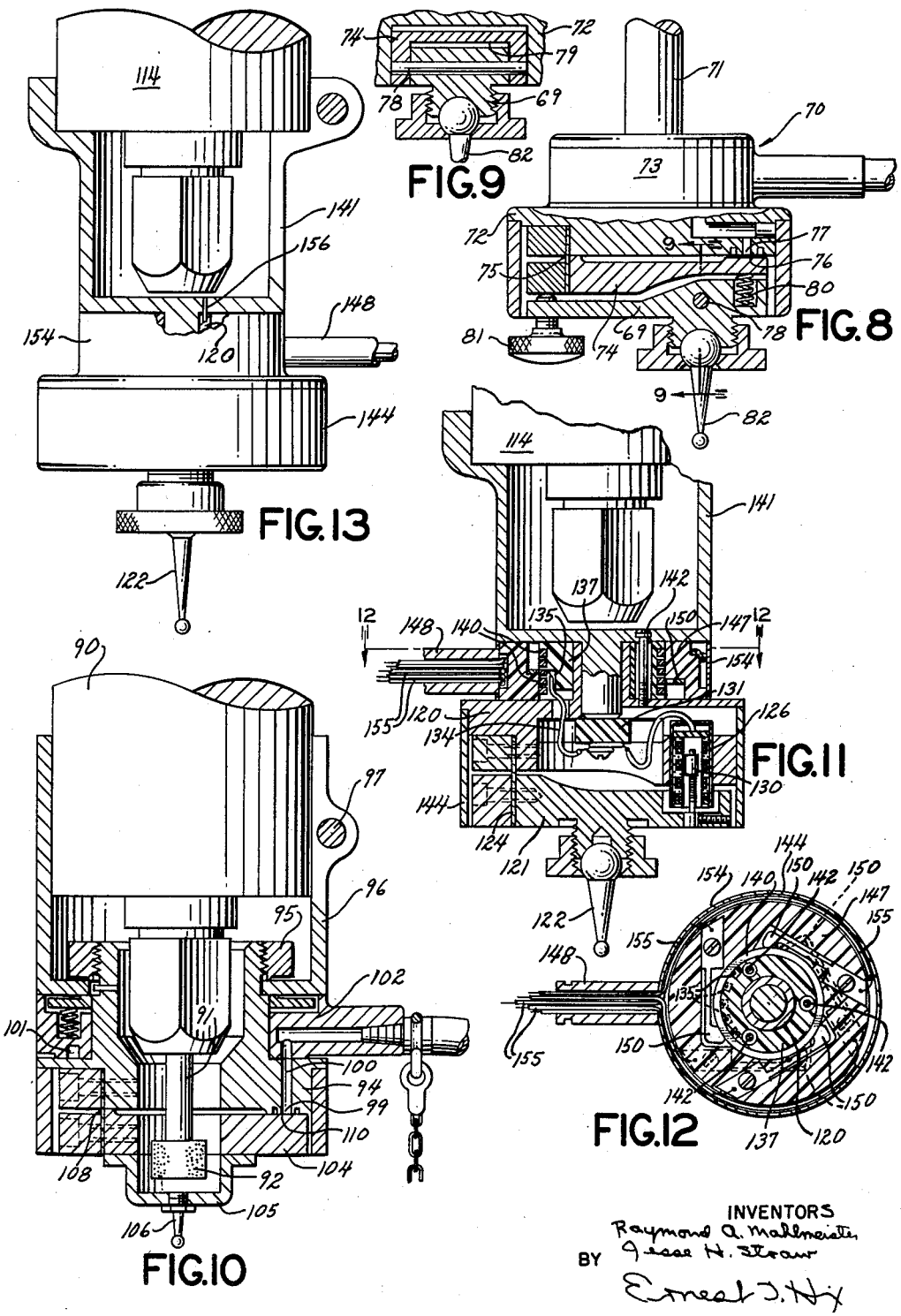

United States Patent Office 3,028,675
Patented Apr. 10, 1962

3,028,675
GAGING DEVICE
Raymond A. Mahlmeister and Jesse H. Straw, Dayton, Ohio, assignors to The Sheffield Corporation, Dayton, Ohio, a corporation of Delaware
Filed Apr. 3, 1958, Ser. No. 726,277
7 Claims. (Cl. 33—172)

This invention relates to a gaging device and more particularly to a device for measuring the relationship of an axis relative to a work surface or the like.

It is an object of this invention to provide an improved gage head particularly adapted for attachment to a rotatable component of a machine tool for precision measurements of the relationship of the axis thereof relative to a hole or other work surface as the component is rotated, the head having features of simplicity in construction and for reliability and extreme accuracy in operation.

It is a further object to provide such a gage head including a frictionless measuring movement and a reduced number of rugged and simply conformed parts, the gage head being adapted for connection to a non-rotatable indicator situated at a remote location for indication during gaging.

It is a further object to provide such a gage head having a work contactor adjustable for a wide range of hole sizes and carried by an arm pivoted for slight movement relative to the body of the head, the gage head components cooperating to provide a flush, substantially uninterrupted exterior broken only by necessary operating clearances, whereby entry of foreign matter is reduced and a compact, ruggedly conformed head is provided.

It is a further object to provide such a gage head having basically only a few simple formed parts including a gaging body connectable at one end to a rotatable component of a machine and carrying a gaging arm at its other end for frictionless pivoting movement during gaging, a non-rotating annular connecting member being supported by bearing engagement with said body between its ends for maintaining gaging connection during rotation of the body relative thereto.

It is a further object to provide such a gage head for use with a jig grinder or the like having a rotatable grinding wheel and spindle carried eccentrically by a rotating housing, the gage head being connectable to and rotatable with the housing to measure the relationship of the axis about which it moves relative to a work surface or the like.

Other objects and advantages will be apparent from the following description, the appended claims, and the accompanying drawings, in which:

FIGURE 1 illustrates a gage head embodying the present invention shown in association with a work piece and connected to an exemplary indicating instrument.

FIGURE 2 is a vertical transverse section through the gage head of FIGURE 1.

FIGURES 3 and 4 are sectional views taken on lines 3—3 and 4—4 of FIGURE 2 respectively.

FIGURE 5 is a fragmentary section taken on line 5—5 of FIGURE 4.

FIGURES 6 and 7 are diagrammatic illustrations of different applications and modifications of the gage head of FIGURE 1.

FIGURE 8 illustrates in partial central section a gage head similar to that of FIGURE 1 but including a fine adjustment for the work contactor.

FIGURE 9 is a fragmentary section taken on line 9—9 of FIGURE 8.

FIGURE 10 illustrates a modified form of the invention for connection to the eccentric housing of a jig grinder or the like and receiving the grinding wheel and grinding spindle.

FIGURE 11 is a vertical central section of a gage head including features of the present invention provided for connection to the supporting housing of a jig grinder or the like and having an electric gaging circuit.

FIGURE 12 is a sectional view taken on line 12—12 of FIGURE 11, and

FIGURE 13 illustrates the exterior of the gage head of FIGURE 12 partially broken away.

In a number of machine tools it is extremely important to determine the disposition of the axis of rotation of a rotatable component relative to a hole or other work surface. This is especially important in machines such as jig borers and jig grinders where extremely high accuracy results are demanded. In jig borers for example it is quite important to determine precisely the relationship between the axis of the boring spindle and the axis of a hole in a part. In a jig grinder it is important to determine the relationship of the axis about which the wheel carrying spindle or housing moves with respect to the work passage to be enlarged. The present invention provides an improved gage head for particular use with such machines which is connectable coaxially with the operating spindle for movement therewith to provide indications of displacement of the work surface radially or axially relative to the axis of rotation.

The gage head of this invention includes a body which is connectable at one end to the rotatable component of a machine and carries a gaging assembly including a work contact at its other end. A slidable or bearing connection is provided between the ends of the body to maintain gaging connection between a remote stationary indicator and the rotating gaging means of the head.

FIGURES 1 to 5 illustrate in detail an exemplary embodiment of this invention especially provided for connection to the spindle 11 of a jig borer or the like. In FIGURE 1 the gage head 12 is shown with its work contactor 14 in engagement with a work piece 15 and connected to a remote indicating instrument 13. This exemplary instrument is of the pneumatic type, including an indicating column 19 and float 10.

Head 12 includes a gaging body 16 which has an upwardly extending shank 17 for connection to a rotatable component of a machine and a lower radially enlarged portion 18. Body 16 supports a gaging assembly at its lower end which includes an arm 20 extending transverse of the axis of the head to each side thereof. Arm 20 is carried in close interfitting relationship with a groove extending transverse body portion 18 and is pivoted for swinging movement transverse the axis of the body by means of a leaf spring 21 fixed to portion 18 of body 16 by screws such as that indicated at 22 and to arm 20 by screws one of which appears at 24. Thus a frictionless pivot support is provided for the arm at a fixed disposition relative to the axis of gage head 12.

Cooperating gaging components are provided between body portion 18 and arm 20 at the end thereof remote from leaf spring 21. As illustrated in FIGURE 2 these components include a fluid leakage orifice 25 provided in body portion 18 and an opposing flow controlling surface 26 on arm 20 at the opposite side of the body from the pivot provided by leaf spring 21.

A work contactor stylus 30 has a spherical upper end 31 clamped against a projection 32 on arm 20 by a knurled nut 34. Insert 35 and spring 36 seated in projection 32 maintain contact 30 in its adjusted positions until nut 34 is turned to positively clamp it against movement. Arm 20 is not radially adjustable on body 12 so that complexity and number of parts is reduced for ruggedness and extreme accuracy. However, contact 30 is widely adjustable.

An annular connecting member 40 is supported by body 16 between its ends. Member 40 includes a fluid conduit 41 in communication with a circular groove 42 in the upper surface of the lower portion 18 of body 16. An arm 44 fixed to member 40 includes a flexible connection 45 leading to instrument 13. A chain 47 connected to arm 44 is attachable to a part of the machine to prevent connecting member 40 from rotating during rotation of body 16. Passage 48 in the lower portion 18 of body 16 leads from groove 42 to orifice 25. A sleeve 50 connected to the lower portion of body 16 encloses the gaging assembly. The crescent block through which screws 24 pass fills the remaining void at the lower portion of the head within sleeve 50. Stop screw 52 extends, with clearance, through arm 20 and into body 16 to limit swinging movement of arm 20 in a direction to separate flow controlling surface 26 and orifice 25 as work contact 30 is moved upon engagement with a work surface.

It will be noted that the outer periphery and lower surface of head 12 are substantially flush and uninterrupted, broken only by the minimum operating clearances required. Sleeve 50 extends down to the level of the lower surface of arm 20 and arm 20 lies closely in its receiving groove. Thus compactness and ruggedness is achieved and entry of foreign matter is reduced, resulting in gaging of the highest accuracy.

An upper retaining plate 55 held in position on shank 17 by snap ring 56 acts downward against washer 60 to urge springs 61 against connecting member 40 to maintain a seal between member 40 and the upper surface of lower body portion 18. A pair of pins 62, seated in member 40, extend into slots such as indicated at 64 in FIGURE 5 provided in washer 60 to maintain the washer stationary with member 40.

Such air as does leak from groove 42 is collected in a channel 59 on the lower surface of member 40 and escapes to atmosphere through slots provided therein. This reduces any separating force due to leakage pressure.

In FIGURE 6 a different contact or stylus 58 is provided for engaging the upper surface of a work piece 65 to check the squareness of axis 66 relative thereto as the head rotates. In FIGURE 7 a still further modified contact 67 is shown as applied to checking an external circular surface.

The gage head 70 of FIGURE 8 is substantially the same in its basic construction as that of FIGURE 1. It includes a connecting shank 71, a body 72, and a sliding connecting member 73. It is useful particularly in jig borer applications to have a fine adjustment for radial displacements of the tip of the work contact which is itself adjustable for major displacements. In the construction of FIGURE 8 a first arm 74 is connected by leaf 75 to body 72 and provides a flow controlling surface 76 in opposition to a gaging orifice 77. First arm 74 has a longitudinal groove 79 (see FIGURE 9) in which is pivotally mounted a second arm 69 by means of a pin 78. Spring 80 biases the corresponding ends of arms 74 and 69 apart to positions determined by the threading of screw 81 within arm 69. Screw 81 thus provides a fine adjustment of contact 82 radially. It will be understood that this fine adjustment modification can be used as desired in the other illustrated embodiments.

Jig grinding machines includes a housing such as that indicated at 90 in FIGURE 10 which is supported by a main spindle and rotates eccentrically about an axis while in turn carrying a rotating grinding spindle with a grinding wheel 92 attached thereto by a stem 91. The particular construction of this figure makes possible the mounting of a gage head of the present type to the housing without disconnecting or removing the grinding wheel and its stem. As the main spindle rotates the gage head checks the concentricity of the path of movement of housing 90 relative to the axis about which it is carried.

In this embodiment a gaging body 94 is connected by nut 95 to the lower end of a cup-like coupling 96 which can be fixed to housing 90 by a screw indicated at 97. Body 94 provides a leakage orifice 99 which communicates through passage 100 with a groove 101 in a connecting member 102 which in construction and function is similar to that of the modification previously described. A gaging arm 104 having a downward extension 105 with a contact 106 is pivotally mounted from body 94 through leaf spring 108. Arm 104 provides a surface 110 opposing orifice 99 to control the escape of air therefrom as contactor 106 is swung upon engagement with a work surface. Body 94 and arm 104 as well as projection 105 have central openings therethrough to accommodate the spindle and wheel of the grinder. Contact 106 is disposed at substantially the same level as wheel 92 so that measurements are made adjacent the operating location along the spindle axis, providing the utmost in realistic and precise measurement.

Thus a gage head is provided which can be detachably connected to a jig grinder or the like without disassembling the machine components. It will be noted that contact 106 is concentric with the axis of the assembly in the embodiment of FIGURE 10 and this is possible because in this type machine extremely precise adjustments are provided for radially positioning housing 90 relative to the central axis about which it moves.

FIGURES 11 to 13 illustrate a further modification including an electrical circuit providing the measuring indication and having an upper connection for attachment to a rotatable component 114 of a jig grinder or the like. However with this construction the stem and grinding wheel must be removed.

In this instance body 120 supports a gaging arm 121 and contact 122 through a flexible leaf 124. Body 120 carries a differential transformer unit 126 of known construction and pivoting movements of arm 121 about the axis provided by leaf 124 positions a core or armature 130 relative to the windings of transformer 126. Leads from transformer 126 are connected to a terminal plate 131 for ease of assembly and disassembly of the head. Leads 134 from plate 131 extend up through grooves 135 provided in disc 137 and connect to circular slip rings 140. The lower end of coupling 141 and body 120 are drawn together by screws 142 extended through disc 137. Pin 156 (see FIGURE 13) extends from coupling 141 into body to prevent relative rotation. Sleeve 144 encloses the lower gaging assembly. Sleeve 154 on connecting member 147 mounts an arm 148 extending radially therefrom as with the outer modifications and supports sliding contacts 150 which are provided for each of the slip rings 140 at the respective levels thereof. Leads 155 from contactors 150 extend out through arm 148 to a suitable indicating device. An electric instrument circuit which can be employed with this arrangement is disclosed and illustrated in application No. 501,602, filed April 15, 1955.

Thus in the modification of FIGURES 11 to 13 gaging signals provided through movement of armature 130 relative to transformer 126 are transmitted through the sliding connections provided by the slip rings 140 of disc 137 and the sliding contacts 150 of member 147.

Each of the illustrative embodiments is similar in its basic construction and operation and features can be employed in different combinations. For example it is obvious that the mounting structure of FIGURE 10 or 11 can be used with the gaging structure of FIGURE 1 or that the head of FIGURE 1 could include the electrical gaging arrangement of FIGURES 11 and 12. As the rotatable component of the machine rotates it carries the gage head with it and the gaging contact moves along the work surface. Variations in disposition of the work surface longitudinal of the axis of rotation (see FIGURE 6) or radial of the axis (see FIGURE 7) are transmitted through the sliding connections provided and are indicated by an indicator which is stationary and remote.

Thus it is seen that a gage head is provided with advantages for universal application for features of simplicity and unique design making possible gaging operations of precision not possible with previous known devices of this type. Not only can the axial relation of an operating grinding spindle or the like relative to a work surface be checked but, conversely, with a master reference the accuracy and reliability of the spindle itself can be ascertained.

While the form of apparatus herein described constitute the preferred embodiments of the invention, it is to be understood that this invention is not limited to these precise forms of apparatus and that changes may be made therein without departing from the scope of the invention which is defined in the appended claims.

What is claimed is:

1. A gage head for determining the relationship between the axis of a rotatable component of a machine and a work surface or the like, comprising an integral gaging body having an upwardly extending shank for attachment to said component and a lower enlarged supporting portion, said lower portion having a downwardly facing groove extending transversely across its lower face, a gaging arm fitted closely within said groove and extending to opposite sides of the axis of rotation of said body, said arm and the lower portion of said body together providing a substantially smooth, uninterrupted outer surface and enclosure at the lower end of said unit, a leaf spring connected between the lower portion of said body and one end of said arm supporting said arm for swinging movement about an axis transverse the axis of rotation, gaging means cooperating between said body and said arm at the opposite end thereof including a fluid leakage orifice in said body controlled by movements of said arm, a gaging contact, means adjustably connecting said contact to said arm at a point radially offset adjacent said cooperating gaging means, an annular connecting member supported coaxially on said body above said lower portion and in engagement therewith, cooperating first and second gaging connection means respectively provided on said body and member for transmitting fluid under pressure to said orifice while relatively rotating, means connecting the first of said connection means to said leakage orifice, and means for connecting the second of said connection means to an indicating instrument supported independent of said gage head.

2. A gage head for determining the relationship between the axis of a rotatable component of a machine and a work surface or the like, comprising an integral gaging body having an upwardly extending shank for attachment to said component and a lower enlarged supporting portion, said lower portion being round and having a downwardly facing groove of rectangular cross section extending transversely across its lower face, the major cross-sectional dimension of said groove being disposed transverse the axis of said head, a gaging arm of similar disposition and cross-sectional configuration closely interfitted within said groove and extending to opposite sides of the axis of rotation of said body, said arm fitting within said groove with only an operating clearance relative to the sides thereof, limit means cooperating between said body and said arm, a leaf spring fixedly connected between the lower portion of said body and one end of said arm supporting said arm for swinging movement about an axis transverse the axis of rotation at one side thereof, gaging means including first and second gaging components in cooperating relationship between said body and said arm at the opposite side of said axis, a gaging contact, means adjustably connecting said contact to said arm at a point radially offset adjacent said cooperating gaging means, the outer periphery of the lower body portion being uninterrupted and terminating substantially flush with the lower surface of said arm and the lower surface of said head being uninterrupted except for operating clearances for said arm, an annular connecting member supported coaxially on said body above said lower portion and in engagement therewith, cooperating first and second gaging connection means respectively provided on said body and member for transmitting a gaging signal while relatively rotating, means connecting the first of said connection means to said gaging means, and means for connecting the second of said connection means to an indicating instrument supported independent of said gage head.

3. A gage head for determining the relationship between the axis of a rotatable component of a machine and a work surface or the like, comprising a gaging body, a gaging assembly at one end of said body, connection means at the other end of said body for attachment to said component to rotatably support said body during gaging, said gaging assembly including a movable work engaging contact, cooperating gaging means responsive to relative movement between said body and said contact including a fluid leakage orifice in said body controlled by movements of said contact, an annular connecting member supported coaxially on said body between its ends, rotation preventing means on said member, said body and member having opposing engaging faces in a plane transverse the axis of rotation of said body, cooperating first and second gaging connection means respectively provided in said cooperating faces for transmitting a gaging signal while relatively rotating, including an annular groove in one and cooperating conduit means in the other, means connecting the first of said connection means to said orifice, means for connecting the second of said connection means to a source of air under pressure and a flow responsive indicating instrument supported independent of said gage head, and resilient means cooperating between said body and said annular connecting member urging said opposing faces together for sealing purposes.

4. A gage head for determining the relationship between the axis of a rotatable component of a machine and a work surface or the like, comprising a gaging body, a gaging assembly at one end of said body, connection means at the other end of said body for attachment to said component to rotatably support said body during gaging, said gaging assembly including a first arm extending transverse the axis of rotation of said body to opposite sides thereof, frictionless pivot means at one side of said axis supporting said arm on said body for swinging movement relative thereto, cooperating gaging means on said body and said arm at the other side of said axis responsive to movement therebetween, a second arm extending parallel to said first arm and carried thereby, a gaging contact, means adjustably supporting said gaging contact on said second arm at a location radially offset from the axis of body rotation and at the opposite side thereof from said frictionless pivot means, manually adjustable means cooperating between said first and second arms for obtaining fine adjustments therebetween for positioning said contact for gaging, a connecting member supporting coaxially on said body between its ends, rotation preventing means on said member, cooperating first and second gaging connection means respectively provided on said body and member for transmitting a gaging signal while relatively rotating, means connecting the first of said connection means to said gaging means, and means for connecting the second of said connection means to an indicating instrument supported independent of said gage head.

5. A gage head as set forth in claim 4 including means pivotally supporting said second arm on said first arm, spring means cooperating between said arms at corresponding ends biasing the arms apart, and a fine adjustment screw threaded into one arm and engaging the other at the other ends thereof for varying the relative separation between the spring biased ends of said arms.

6. A gage head for determining the relationship between an axis of a rotatable component of a machine such as jig grinding machine or the like having rotating grinding wheel and spindle carried eccentrically by a rotating housing, comprising a gaging body, a gaging assembly at one end of said body including a movable contactor for engagement with a work surface, gaging means in said body controlled by said contactor, connection means at the other end of said body including detachable coupling means for connection to said housing, said gage head having a cup-like cavity in its upper portion for receiving at least the spindle of the machine, said movable contactor being carried at substantially the same level relative to said housing as the grinding wheel in the operating machine, a connecting member supported coaxially on said body between its ends, rotation preventing means on said member, said connecting member comprising first and second gaging connection means respectively provided on said body and member for transmitting a gaging signal while relatively rotating, means connecting the first of said connection means to said gaging means, and means for connecting the second of said connection means to an indicating instrument supported independently of said gage head.

7. A gage head for use with a jig grinding machine or the like having a rotating grinding wheel and grinding spindle carried eccentrically by a rotating main spindle for measuring the relationship between an axis thereof and a work surface or the like, comprising a gaging body, a gaging assembly at one end of said body, connection means at the other end of said body, said connection means including an adjustable clamp for engagement about the housing of said grinding spindle having a cup-like cavity therein for receiving at least the spindle of said machine, said gaging assembly including a gaging arm extending transverse the axis of rotation of said body to opposite sides thereof, frictionless pivot means at one side of said axis supporting said arm on said body for swinging movement relative thereto, cooperating gaging means on said body and said arm at the other side of said axis responsive to relative movement therebetween, a gaging contact on said arm for positioning engagement with said work surface, a connecting member supported coaxially on said body between its ends, rotation preventing means on said member, cooperating first and second gaging connection means respectively provided on said body and member for transmitting a gaging signal while relatively rotating, means connecting the first of said connection means to said gaging means, and means for connecting the second of said connection means to a indicating instrument supported independent of said gage head.

References Cited in the file of this patent

UNITED STATES PATENTS

| | | |
|---|---|---|
| 1,515,867 | Masone | Nov. 18, 1924 |
| 1,723,529 | Schwieterman | Aug. 6, 1929 |
| 2,583,791 | Neff | Jan. 29, 1952 |
| 2,627,119 | Graham | Feb. 3, 1953 |
| 2,736,101 | Blume | Feb. 28, 1956 |
| 2,777,257 | Johnson | Jan. 15, 1957 |
| 2,814,124 | Blake | Nov. 26, 1957 |
| 2,849,799 | Muller | Sept. 2, 1958 |

FOREIGN PATENTS

| | | |
|---|---|---|
| 904,443 | France | Feb. 26, 1945 |